Dec. 29, 1964  L. G. HOBART  3,163,084
SLOT-CUTTING ACCESSORY FOR MACHINE TOOLS
Filed Oct. 16, 1961  3 Sheets-Sheet 1
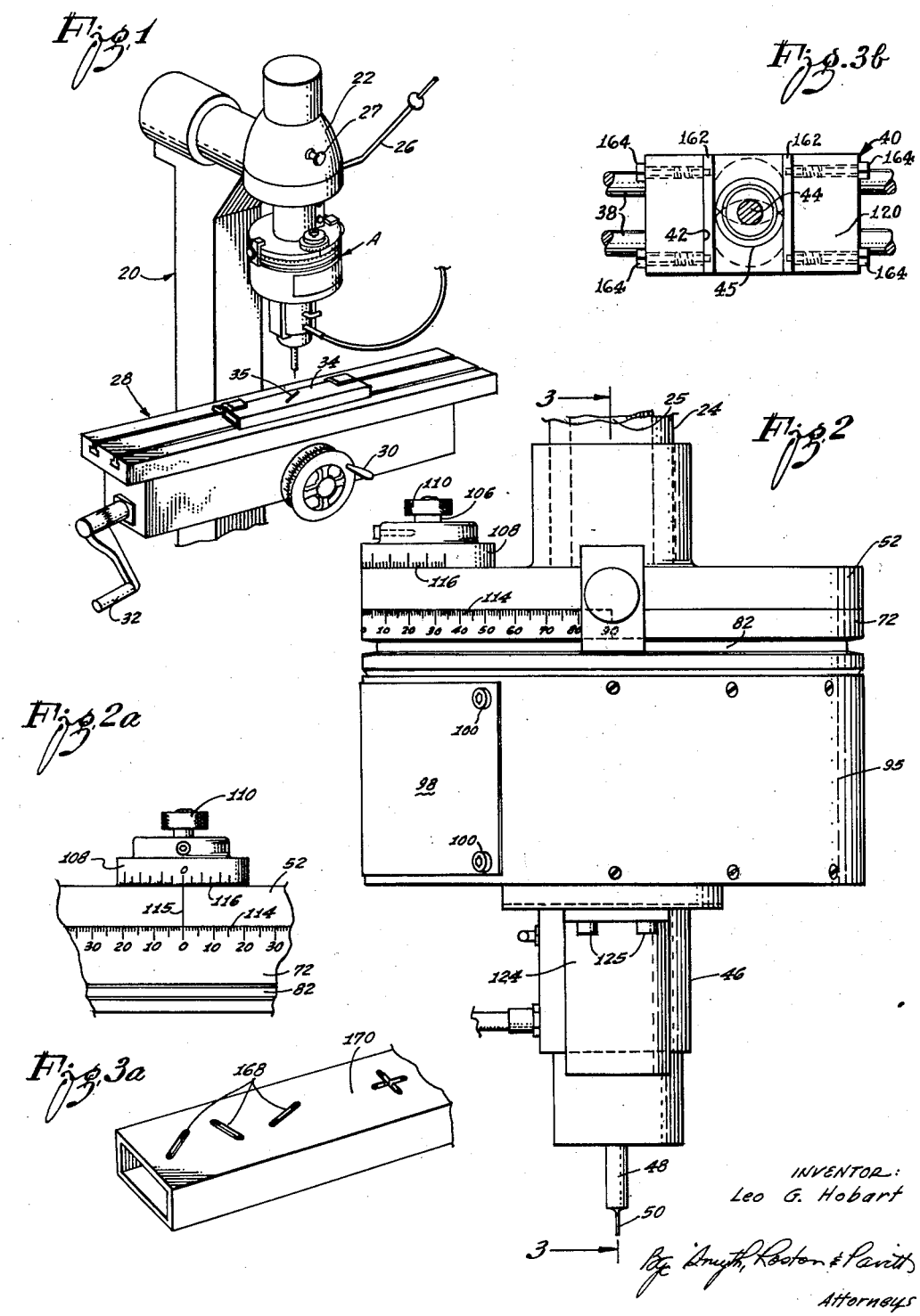
INVENTOR:
Leo G. Hobart
Attorneys

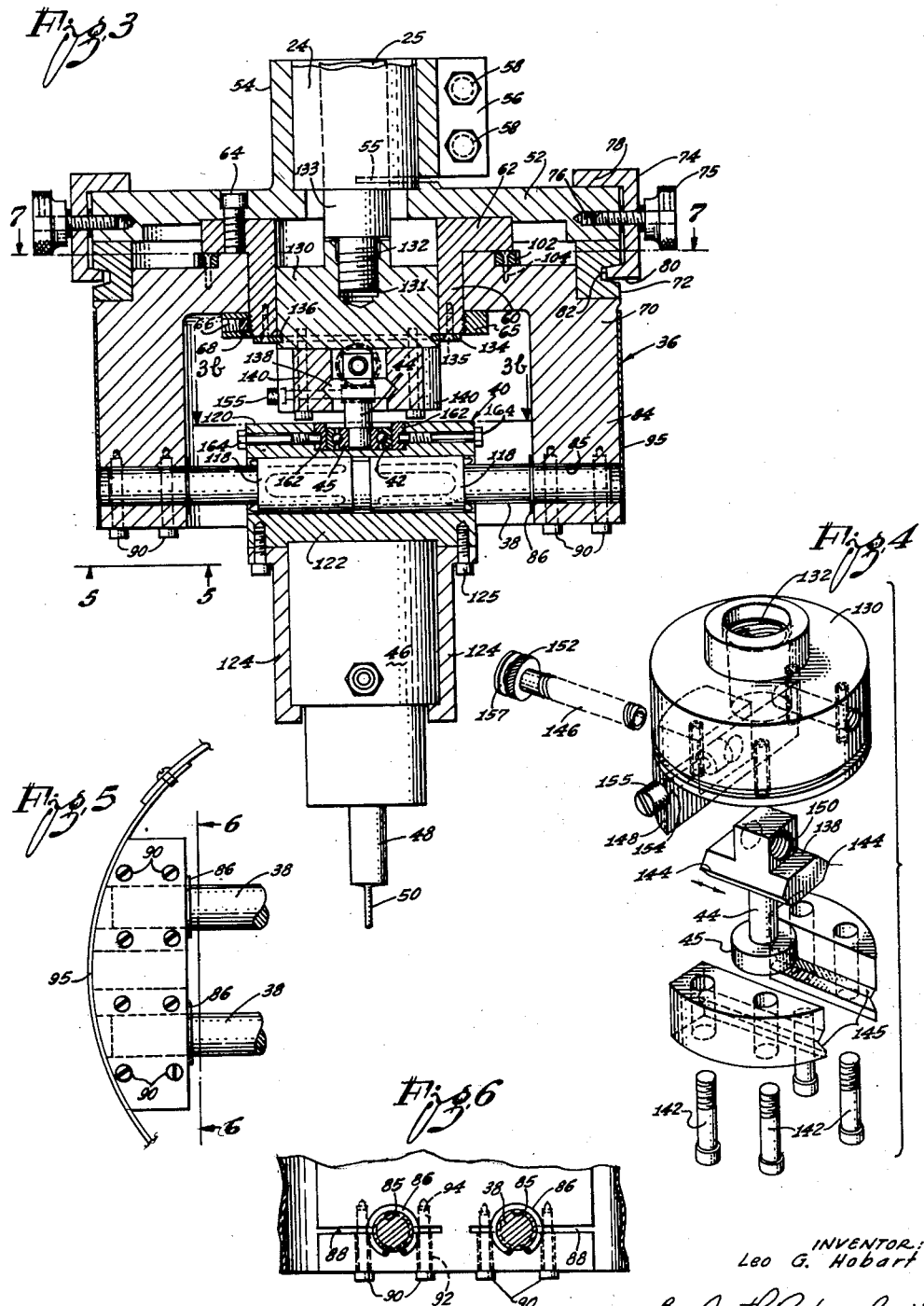

Dec. 29, 1964    L. G. HOBART    3,163,084
SLOT-CUTTING ACCESSORY FOR MACHINE TOOLS
Filed Oct. 16, 1961    3 Sheets-Sheet 3
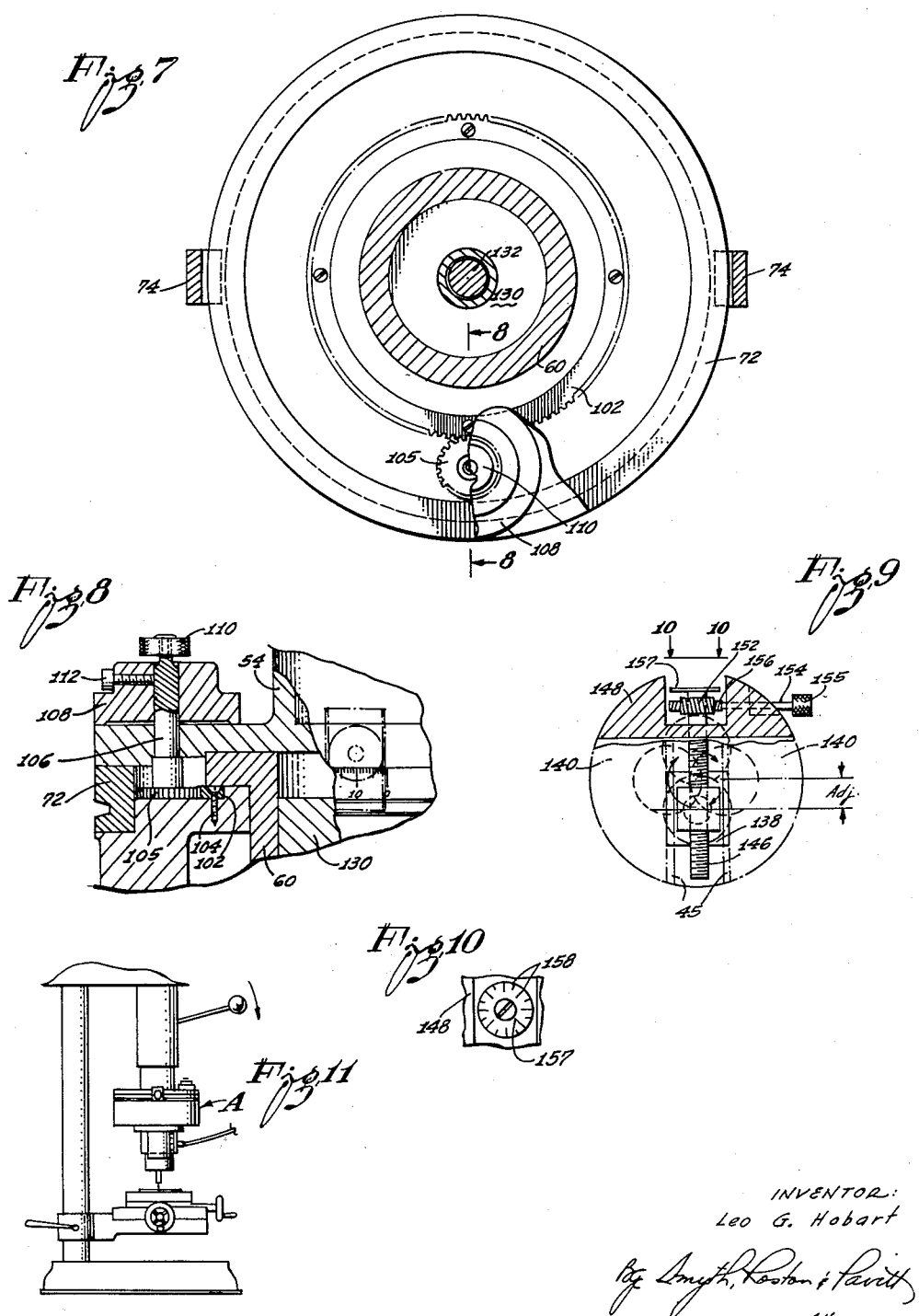
INVENTOR:
Leo G. Hobart
Attorneys

United States Patent Office 3,163,084
Patented Dec. 29, 1964

3,163,084
SLOT-CUTTING ACCESSORY FOR
MACHINE TOOLS
Leo G. Hobart, 4045 W. Imperial Highway,
Inglewood, Calif.
Filed Oct. 16, 1961, Ser. No. 145,177
12 Claims. (Cl. 90—15)

This invention relates to a metal cutting apparatus, and more particularly, relates to means for cutting slots in work pieces.

While the principles of the invention may be incorporated in the factory construction of a machine tool, the invention has special utility as an accessory for attachment to an existing machine tool, such as a vertical mill or a jig borer, to adapt the machine tool for cutting slots. An embodiment of the invention in the form of such an accessory has been selected for the purpose of the present disclosure. The description of the accessory will provide adequate guidance for those skilled in the art who may have occasion to apply the same principles for other specific purposes.

An accessory constructed in accord with the invention is inexpensive in comparison with the cost of a rotary mill but the accessory makes it possible to adapt a vertical mill or a jig borer to serve the same purpose as a rotary mill. Thus the invention can save the cost of investing in a rotary mill. A further advantage of the invention, moreover, is that whereas a rotary mill requires a highly skilled operator, the present accessory is simple to operate. Thus the invention reduces the cost of production by enabling a relatively unskilled operator to set up the machine and cut slots rapidly with high precision. In addition, the invention provides a cutting operation that results in slots that are actually superior in finish to slots cut by a rotary mill.

For use on a vertical mill, for example, the accessory comprises a linear guide structure for mounting on the fixed structure of the vertical mill, a carriage movably mounted on the guide structure, a mechanism actuated by the vertical mill for reciprocating the carriage on the guide structure, a rotary tool on the carriage for cutting slots, and auxiliary power means on the carriage to actuate the cutting tool. Thus the accessory is a self-contained unit.

The linear guide means which determines the direction of reciprocation of the carriage and thereby determines the orientation of the slot may be rotatably adjustable and may be provided with index means for accurate orientation of the slot. If the accessory is to be used on a machine tool which has a rotatably adjustable head or has a rotatably adjustable bed, the linear guide means of the accessory need not be rotatably adjustable.

In the preferred practice of the invention the mechanism for reciprocating the carriage is a scotch yoke comprising a transverse slot in the carriage and a crank member which is actuated by the vertical mill and slidingly engages the slot. The eccentricity or throw of the crank member is adjustable to vary the range of reciprocation of the slot-cutting tool and thus vary the length of the slot. Suitable index means is provided for accurate adjustment of the crank member in this respect. For this purpose the crank member may be adjustable along a radial guideway by an adjustment screw and suitable index means may be associated with the screw.

A further feature of the invention is that the reciproactive carriage is mounted on a pair of guide rods which are normally fixed but may be rotated on their axes. Periodic rotary shift of the two guide rods on their axes distributes wear to maintain accuracy.

The features and advantages of the invention may be understood from the following description and from the accompanying drawings.

In the drawings, which are to be regarded as merely illustrative:

FIG. 1 is a perspective view of a vertical mill equipped with a selected embodiment of the invention;

FIG. 2 is an enlarged elevation of the accessory shown in FIG. 1;

FIG. 2a is a fragmentary elevational view showing two scales for use in adjusting the orientation of a slot that is to be cut;

FIG. 3 is a section of the accessory taken along the line 3—3 of FIG. 2;

FIG. 3a is a perspective view of a work piece with various slots cut therein;

FIG. 3b is a fragmentary section along the line 3b—3b of FIG. 3, showing the transverse slot in which the crank operates;

FIG. 4 is an exploded view of the adjustable scotch yoke mechanism;

FIG. 5 is a fragmentary bottom view as seen along the line 5—5 of FIG. 3 showing linear guide means in the form of a pair of parallel round rods;

FIG. 6 is a section along the line 6—6 of FIG. 5 showing how the two guide rods are secured in a manner that permits the rods to be rotated for wear distribution;

FIG. 7 is a view of the device that is partly in plan and partly in section, the section being taken along the line 7—7 of FIG. 3;

FIG. 8 is an enlarged fragmentary section taken along the line 8—8 of FIG. 7 to show the means for adjusting the orientation of the slot-cutting action;

FIG. 9 is a view partly in section and partly in plan showing the means for adjusting the throw of the crank member;

FIG. 10 is an elevational view of an index means as seen along the line 10—10 of FIG. 9; and FIG. 11 is an elevational view of an accessory embodying the invention with the accessory mouted on a drill press.

FIG. 1 shows a conventional vertical mill having fixed structure which includes an upright frame 20 and an overhanging housing 22. As indicated in FIGS. 2 and 3 the overhanging housing 22 includes a downwardly extending cylindrical portion 24 which encloses the usual downwardly extending power actuated vertical spindle 25. The usual handle 26 may be used to advance a cutting tool downward or instead a control knob 27 may be manipulated for automatic progressive advance of a cutting tool. FIG. 1 shows an accessory, generally designated A, mounted on the vertical mill, the accessory being constructed in accord with the teachings of the invention.

The vertical mill includes the usual bed 28 which is adjustable in two directions perpendicular to each other by means of two cranks 30 and 32. FIG. 1 shows a work piece 34 clamped on the bed 28 with the accessory adjusted to cut a diagonal slot 35 in the work piece.

Referring to FIG. 3, the principal parts of the accessory A include the following: a guide structure generally designated 36 which is mounted on the fixed structure of the vertical mill and which incorporates a linear guide means in the form of a pair of parallel guide rods 38; a carriage generally designated 40 which is movably mounted on the two guide rods and which is provided with a transverse slot 42 that is perpendicular to the two guide rods; a crank member 44 that is adapted for actuation by the spindle 25 of the vertical mill, the crank extending into the slot 42 of the carriage to cause reciprocation of the carriage; a ball bearing 45 journalled on the crank member in sliding engagement with the slot 42; a motor 46 mounted on the underside of the carriage 40; and a downwardly extending rotary tool holder 48 driven by the motor 46, the tool holder being adapted to hold a suitable rotary cutting tool 50.

In the construction shown in FIGS. 2 and 3, the guide structure 36 is made in two parts that are rotatable relative to each other to permit the guide structure to be oriented in various directions to determine the orientation of the slot that is to be cut in the work piece. As best shown in FIG. 3 the fixed portion of the guide structure i.e., the support structure that is directly attached to the vertical mill, includes a circular upper plate 52 and a sleeve 54 integral therewith. The sleeve 54 is split longitudinally and is formed with a transverse slot 55 to make the split ends flexible. The two split ends of the sleeve 54 are provided with corresponding flanges 56 which are interconnected by cap screws 58. To mount the accessory on the vertical mill the sleeve 54 with the screws 58 loosened is telescoped over the cylindrical portion 24 of the overhanging housing 22 of the vertical mill and the cap screws 58 are then tightened to tighten the sleeve.

Mounted on the underside of the upper plate 52 is an axial sleeve 60 having a radial circumferential flange 62, the sleeve being secured to the upper plate by suitable screws 64. The lower end of the sleeve 60 is provided with a screw thread to receive a retaining nut 65 and the retaining nut 65 is immobilized by a set screw 66 of a well-known type having a plastic insert 68 for locking action.

The rotary section of the guide structure comprises a guide yoke 70 which rotatably embraces the sleeve 60 and rests on the retaining nut 65. Fixedly attached to the guide yoke 70 is an outer circumferential ring 72 which lies against the upper plate 52 and which is employed for clamping the guide yoke at selected rotary positions. For this purpose a pair of U-shaped clamps 74 may be provided at diametrically opposite points on the periphery of the upper plate 52. Each of the U-shaped clamps 74 is supported by a corresponding thumb screw 75 which extends through the clamp and is threaded into a radial bore 76 in the upper plate 52. One leg 78 of each of the U-shaped clamps 74 rests on the top of the upper plate 52 and the other leg 80 extends into an outer circumferential groove 82 in the ring 72. In the construction shown, the upper wall of the circumferential groove 82 is tapered and the lower leg 80 of each of the clamps 74 is also tapered to result in a wedging action for immobilizing the ring when the two thumb screws 75 are tightened.

The yoke 70 has two spaced downwardly extending arms 84 and the opposite ends of the two previously mentioned guide rods 38 are mounted in bores 85 in these arms. In the construction shown in FIGS. 3, 5 and 6, each of the two guide rods 38 is secured against axial movement by two snap rings 86 which seat in circumferential grooves in the guide rods and which abut the two yoke arms 84 respectively.

A feature of the invention is that the two guide rods 38 may be periodically rotated slightly for wear distribution. For this purpose the two guide rods are anchored against rotation in a releasable manner. As shown in FIG. 6, each of the yoke arm 84 is provided with a pair of transverse slots 88 which intersect the corresponding bores 85. A pair of screws 90 intersects each of the two slots 88 on each side of each of the two guide rods 38 for the purpose of releasably tightening the material of the yoke arm against each of the guide rods 38. Each of the screws 90 extends loosely through an outer bore 92 and is in screw-threaded engagement with a corresponding inner bore 94. It is merely necessary to loosen the two screws 90 temporarily whenever it is desired to rotate the two guide rods 38 slightly to new positions for wear distribution.

The guide yoke 70 may be enclosed in any suitable manner. As shown in FIG. 2 a cylindrically curved sheet metal wall 95 may be mounted on the guide yoke 70 by suitable screws 96. The sheet metal wall 95 is open on one side for access to the interior of the guide yoke and this access opening is closed by a cover plate 98 shown in FIG. 2, the cover plate being releasably secured by thumb screws 100.

A feature of the selected embodiment of the invention is the provision of means for rotating the yoke 70 for accurate orientation of the slot that is to be cut in a work piece. As shown in FIG. 3 the yoke is provided with a concentric gear 102 in the form of a ring that is secured to the yoke by screws 104. As shown in FIG. 8, a pinion 105 in mesh with the gear 102 is mounted on the lower end of a stub shaft 106. Rotatably mounted on the upper exposed end of the stub shaft 106 is a manually rotatable knob 108 and a nut 110. The knob 108 is provided with a radial thumb screw 112 which may be tightened when desired to fix the knob relative to the stub shaft.

For guidance in rotational adjustment of the guide yoke 70 a scale 114 in angular degrees is provided on the upper edge of the guide yoke, the scale being on the periphery of the ring 72 that is unitary with the guide yoke. As shown in FIG. 2a a vertical index mark 115 is provided on the adjacent outer circumferential surface of the fixed upper plate 52 for cooperation with the scale 114. The knob 108 is positioned adjacent the vertical index mark 115 and the knob is provided with a circumferential scale 116 to be used with reference to the vertical index mark. FIG. 2a shows a starting position for adjusting the orientation of a slot to be cut in a work piece, at which starting position the zero point on the yoke scale 114 and the zero mark on the knob scale 116 are both accurately registered with the vertical index mark 115. To adjust the mechanism for this starting position the thumb screw 112 may be loosened, if necessary, to permit precise registration of the zero mark on the knob scale 116 with the vertical index mark 115.

The yoke scale 114 may extend 90° in both directions from the zero point as indicated in FIGS. 2 and 2a. The knob scale 116 may be of any convenient graduations to aid in precisely measuring rotation of the guide yoke 70 through any desired angle. Thus the guide yoke may be rotated to place any selected mark on the guide yoke scale 114 at the index mark 115 and then the knob 108 may be rotated manually for the final precise adjustment. The knob scale 114 may be calibrated in angular minutes or in decimal proportions and may function in the manner of a micrometer scale.

The carriage 40 may be of any suitable construction. As indicated in FIG. 3, for example, the carriage may comprise a pair of spaced bushings 118 mounted on each of the guide rods 38 with an upper plate 120 attached to the upper side of the four bushings and a lower plate 122 attached to the undersides of the four bushings. The bushings 118 are of the well-known type which incorporate steel balls for minimum frictional resistance to movement along the guide rods 38.

The previously mentioned motor 46 may be an electric motor or an air motor or a hydraulic motor. In the construction shown the motor 46 is an electric motor and is mounted on the underside of the lower plate 122 by a pair of hangers 124, the hangers being attached to the lower plate by suitable screws 125.

Any suitable arrangement may be employed to convert the rotation of the vertical spindle 25 of the vertical mill into linear reciprocation of the carriage 40 but the scotch yoke arrangement is preferred. To carry the crank member 44 and connect it to the drill press, a metal body 130 of circular cross section is formed with an internally threaded axial bore 131 to permit the body to be screwed onto the reduced end portion 132 of an adapter 133, the adapter being mounted on the spindle 25. This connector body 130 is journaled in the fixed sleeve 60 and is retained therein by a segmental retaining ring 134. The retaining ring is secured to the lower end of the sleeve 60 by suitable screws 135 and slidingly engages an outer circumferential groove 136 in the connector body 130.

It is contemplated that the crank member 44 will be carried by the connector body 130 in a manner to permit radial adjustment of the crank member relative to the axis of rotation of the spindle 25 for the purpose of varying the range of reciprocation of the carriage 40 to vary the length of slots cut by the tool 50. For this purpose the crank member 44 is mounted on what may be termed a second carriage and the second carriage is movable along what may be termed a second linear guide means.

As shown in FIGS. 3 and 4 the second carriage is a metal block 138 and the second linear guide means comprises a pair of parallel blocks 140 which are mounted on the underside of the connector body 130 by suitable screws 142. As best shown in FIG. 4 the carriage block 138 has tapered longitudinal edges 144 on its opposite sides which slidingly engage corresponding V-shaped guide grooves 145 in the two parallel blocks respectively. For close control of the position of the carriage block 138 an adjustment scerw 146 may be journalled in a block 148 on the underside of the connector body 130 with the adjustment screw in engagement with a threaded bore 150 in the carriage block.

As shown in FIG. 9, close control of the rotation of the adjustment screw 146 may be achieved by providing the adjustment screw with an integral worm gear 152. An adjustment stem 154 with an outer knurled knob 155 is journalled in the block 148 and carries a worm 156 in mesh with the worm gear 152. Thus the adjustment screw 146 may be rotated by fine increments by manual rotation of the knurled knob 155. A feature of this particular arrangement is that the outer end of the adjustment screw 146 is provided with a disk 157 that displays a radial scale 158 as shown in FIG. 10. For example, the radial scale 158 may be calibrated in terms of changes of 1/1000 inch in the radial position of the crank member 44.

The crank member 44 is mounted on the inner race of the previously mentioned ball bearing 45 with the outer race of the ball bearing in sliding engagement with the transverse slot 42 of the first carriage 40. As indicated in FIG. 3 the slot 42 may be lined with a pair of hardened longitudinal bars 162 which are adjustably secured by suitable screws 164.

The manner in which the selected embodiment of the invention serves its purpose is apparent from the foregoing description. To mount the accessory on the vertical mill, the adapter 133 is mounted on the spindle 25, for example by the usual collet, and the connector body 130 is threaded onto the reduced end 132 of the adapter. To carry out this operation the cover plate 98 on the accessory is removed for access to the connector body 130. The sleeve 54 is then tightened around the cylindrical portion 24 of the vertical mill housing by means of the screws 58 to immobilize the upper plate 52 of the accessory with the vertical index mark 115 at a desired radius of the accessory. Usually, as shown in FIG. 1, the index mark 115 is positioned on the radius that is perpendicular to the longitudinal axis of the bed 28. Accurate positioning of the index mark 115 may be achieved by causing the carriage 40 to reciprocate thereby to cause the cutting tool 50 to make a trace on a piece of metal clamped to the bed.

With the vertical index mark 115 accurately positioned, the U-shaped clamps 74 may be loosened temporarily to permit placing the zero point on the yoke scale 114 in accurate registration with the index mark 115. If necessary the thumb screw 112 in the knob 108 is then loosened to permit the zero point on the scale 116 to be accurately registered with the index mark 115. With the direction of reciprocation of the carriage 40 known for a given rotary position of the guide yoke 70 it is a simple matter to manipulate the knob 108 under the guidance of the two scales 114 and 116 to change the orientation of the carriage path through a given angle.

To arrive at the precise adjustment of the adjustment screw 146 required for the cutting tool 150 to cut a slot of a given length, a trial cut may be made in a piece of scrap metal and measured for length. It is a simple matter to rotate the knurled knob 155 manually for advancing or retracting the adjustment scerw 146 to shorten or length the range of reciprocation of the cutting tool by a given fine increment.

When the device is placed into operation the first carriage 40 reciprocates in a sinusoidal manner by virtue of the scotch yoke mechanism. By its mode of operation the invention avoids the disadvantage of existing slotting machines wherein the inherent dwell and consequent interruptions in the machining makes it difficult to cut the ends and sides of slots smoothly. The accessory is simple in its operation and construction and yet cuts slots at high speed with smooth surfaces. Burring is negligible and in most cases does not occur because of the reciprocating cutting action which cannot be duplicated by a rotary mill.

The control knob 27 is manipulated to cause automatic advance of the cutting tool 50 into the work piece because the secret of smoothly cutting slots to achieve superior finish is in advance of the tool by uniform increments. Under some circumstances, however, the handle 26 may be used for manual advance of the cutting tool.

FIG. 3a shows by way of example, a number of slots 168 of different orientations that may be cut in a wave guide by using the described accessory on a vertical mill. If all of the slots are positioned symmetrically with respect to a straight line 170, the accessory may be manipulated to vary the orientations of the slots and the lengths of the slots without affecting the centering of the slots on the straight line.

FIG. 11 shows the same accessory A mounted on a drill press to cut slots in a work piece in the described manner. The accessory may be mounted in the same way on a conventional jig borer.

My description in specific detail of the selected embodiment of the invention will suggest various changes, substitutions and other departures from my invention within the spirit and scope of the appended claims.

I claim:

1. An accessory in the form of a slot-cutting mechanism for use on a machine tool having a power driven rotary member journalled in fixed structure, comprising: a guide structure adapted for fixed attachment to said fixed structure and having linear guide means rotatably mounted thereon for angular adjustment in various directions about the axis of said driven member; a carriage mounted on said guide structure for movement along said linear guide means in moving engagement therewith; an auxiliary rotary member carried by said carriage with its axis parallel with the axis of said driven member of the machine tool and adapted to hold a rotary cutting tool; auxiliary power means on said carriage to actuate said auxiliary rotary member; and a scotch yoke mechanism to operatively connect with said driven rotary member of the machine tool for actuation by rotation of the driven member to reciprocate said carriage along said linear guide means.

2. An accessory in the form of a slot-cutting mechanism for use on a machine tool having a power driven rotary member journalled in fixed structure comprising: a guide structure adapted for fixed attachment to said fixed structure and having linear guide means for positioning transversely of the axis of said driven member; a carriage mounted on said guide structure for movement along said linear guide means in moving engagement therewith, said carriage having a slot perpendicular to said linear guide means; a crank member adapted for operative connection with said rotary member of the machine tool for actuation thereby, said crank member extending into said slot to reciprocate the carriage along the linear guide means; an auxiliary rotary member carried by said carriage with its axis parallel with the axis of said driven member of the machine tool and adapted to hold a rotary cutting tool; and auxiliary power means on said carriage to actuate said auxiliary rotary member.

3. A combination as set forth in claim 2 which includes means slidably mounted in said slot; and which includes anti-friction bearing means surrounding said crank member and connecting the crank member with the slidable means.

4. An accessory in the form of a slot-cutting mechanism for use on a machine tool having a power driven rotary member journalled in fixed structure, comprising: a support structure adapted for fixed mounting on said fixed structure of the machine tool; a guide structure carried by said support structure and having linear guide means for positioning diametrically of the axis of said driven member, said guide structure being rotatably adjustable relative to the fixed structure about said axis to vary the orientation of the linear guide means; a carriage mounted on said guide structure for movement along said linear guide means in moving engagement therewith; an auxiliary rotary member carried by said carriage with its axis parallel with the axis of said driven member of the machine tool and adapted to hold a rotary cutting tool; auxiliary power means on said carriage to actuate said auxiliary rotary member; and means to operatively connect with said driven rotary member of the machine tool to reciprocate said carriage along said linear guide means, said carriage-reciprocating means being adjustable to vary the range of reciprocation.

5. A combination as set forth in claim 4 which includes gearing for rotary adjustment of said guide structure relative to said support structure and which further includes means to lock said guide structure at selected adjusted rotary positions.

6. A combination as set forth in claim 4 which includes index means to indicate the rotary positions of said guide structure relative to said support structure.

7. An accessory in the form of a slot-cutting mechanism for use on a machine tool having a power driven rotary member journalled in fixed structure comprising: a guide structure adapted for fixed attachment to said fixed structure and having linear guide means for positioning transversely of the axis of said driven member; a carriage mounted on said guide structure for movement along said linear guide means in moving engagement therewith, said carriage having a slot perpendicular to the linear guide means; a crank member extending into said slot to reciprocate the carriage along the linear guide means; and a holder for said crank adapted for attachment to said rotary member of the machine tool, said crank member being radially adjustable relative to said holder to vary the range of reciprocation of the carriage.

8. An accessory in the form of a slot-cutting mechanism for use on a machine tool having a power driven rotary member journalled in fixed structure comprising: a guide structure adapted for fixed attachment to said fixed structure and having linear guide means for positioning transversely of the axis of said driven member; a carriage mounted on said guide structure for movement along said linear guide means, said carriage having a slot perpendicular to the linear guide means; a crank member extending into said slot to reciprocate the carriage along the linear guide means; a holder for said crank member adapted for attachment to said rotary member of the machine tool to rotate therewith, said holder having a second linear guide means for positioning radially of the axis of rotation of the holder; and a second carriage mounted on said second linear guide means for adjustment radially of said axis of rotation, said crank member being rigidly mounted on said second carriage.

9. A combination as set forth in claim 8 which includes means to adjust the second carriage along the second linear guide means, said adjusting means including a screw engaging the second carriage and extending parallel to the second linear guide means.

10. A combination as set forth in claim 9 which includes index means to indicate the magnitude of shift of the second carriage in response to a given increment of rotation of said screw.

11. A combination as set forth in claim 10 which includes a manually operable worm and a cooperating worm gear to rotate said screw.

12. A slot-cutting mechanism for use on a machine tool having a power driven rotary member journalled in fixed structure comprising: a support structure adapted for mounting on said fixed structure of the machine tool; a guide structure carried by said support structure and having linear guide means for positioning diametrically of the axis of said driven member, said guide structure being rotatably adjustable relative to the fixed structure about said axis to vary the orientation of the linear guide means; a first carriage mounted on said guide structure for movement along said linear guide means, said carriage having a transverse slot; means including gearing for rotary adjustment of said guide structure relative to said support structure; means to lock said guide structure at adjusted rotary positions relative to said support structure; index means to indicate the rotary position of said guide structure relative to said support structure; a crank member extending into said slot to reciprocate the first carriage along the linear guide means; a holder for said crank member adapted for attachment to said rotary member of the machine tool to rotate therewith, said holder having a second linear guide means for positioning radially of the axis of rotation of the holder; a second carriage mounted on said second linear guide means for adjustment thereon radially of said axis of rotation, said crank member being rigidly mounted on said second carriage; a screw engaging said second carriage and extending parallel to the second linear guide means to adjust the second carriage along the second linear guide means; and index means to indicate the increment of shift of the second carriage in response to a given increment of rotation of said screw.

References Cited by the Examiner

UNITED STATES PATENTS

| | | | |
|---|---|---|---|
| 450,398 | 4/91 | Corliss. | |
| 982,791 | 1/11 | Brull | 29—76 |
| 1,070,888 | 8/13 | Hartog | 90—38 |
| 1,412,915 | 4/22 | Boker | 29—76 |
| 2,100,566 | 11/37 | Munding | 144—136 |
| 2,898,814 | 8/59 | Kinnaman | 90—38 |

WILLIAM W. DYER, JR., *Primary Examiner.*